(12) United States Patent
Ju et al.

(10) Patent No.: US 9,595,743 B2
(45) Date of Patent: Mar. 14, 2017

(54) BATTERY MODULE

(71) Applicant: SK Innovation Co., Ltd., Seoul (KR)

(72) Inventors: Seung Hoon Ju, Daejeon (KR); Dong Hun Lim, Gyeonggi-do (KR); Jae Il Hwang, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 151 days.

(21) Appl. No.: 14/411,733

(22) PCT Filed: Jun. 27, 2013

(86) PCT No.: PCT/KR2013/005671
§ 371 (c)(1),
(2) Date: Dec. 29, 2014

(87) PCT Pub. No.: WO2014/003443
PCT Pub. Date: Jan. 3, 2014

(65) Prior Publication Data
US 2015/0194709 A1    Jul. 9, 2015

(30) Foreign Application Priority Data

Jun. 28, 2012   (KR) ........................ 10-2012-0069520

(51) Int. Cl.
*H01M 10/42* (2006.01)
*H01M 10/48* (2006.01)
*H01M 2/10* (2006.01)
*H01M 2/20* (2006.01)
*H01M 10/647* (2014.01)
(Continued)

(52) U.S. Cl.
CPC ....... *H01M 10/482* (2013.01); *H01M 2/1016* (2013.01); *H01M 2/202* (2013.01); *H01M 10/425* (2013.01); *H01M 10/486* (2013.01); *H01M 10/613* (2015.04); *H01M 10/647* (2015.04); *H01M 10/6555* (2015.04); *H01M 10/653* (2015.04)

(58) Field of Classification Search
None
See application file for complete search history.

(56) References Cited

U.S. PATENT DOCUMENTS 7,914,924 B2   3/2011  Sugeno et al.
2006/0267545 A1  11/2006  Lee et al.
(Continued)

FOREIGN PATENT DOCUMENTS

KR   10-2005-0075284 A   7/2005
KR   10-2006-0102207 A   9/2006
(Continued)

*Primary Examiner* — Jonathan Crepeau
(74) *Attorney, Agent, or Firm* — The Webb Law Firm

(57) ABSTRACT

Provided is a battery module including: a plurality of battery cells which are arranged to be stacked and are electrically connected to each other; a plurality of partitions positioned between the battery cells and having aluminum panels fixed on upper and lower surfaces thereof; and a printed circuit board (PCB) electrically connected to the battery cell, wherein the battery cell and the PCB are connected to each other by one or more voltage sensing wires positioned on the partitions and having one side which is in contact with a bus bar of the battery cell and the other side which is in contact with a PCB terminal formed on the PCB.

5 Claims, 10 Drawing Sheets

(51) Int. Cl.
*H01M 10/6555* (2014.01)
*H01M 10/613* (2014.01)
*H01M 10/653* (2014.01)

(56) References Cited

U.S. PATENT DOCUMENTS

| | | | |
|---|---|---|---|
| 2008/0286640 | A1 | 11/2008 | Naito |
| 2010/0271036 | A1* | 10/2010 | Kishimoto .......... B60L 11/1855 324/434 |
| 2012/0100400 | A1 | 4/2012 | Kang et al. |
| 2013/0071718 | A1* | 3/2013 | Cho ..................... F28F 21/084 429/120 |

FOREIGN PATENT DOCUMENTS

| | | |
|---|---|---|
| KR | 10-2010-0135601 A | 12/2010 |
| KR | 10-2011-0007341 A | 1/2011 |

* cited by examiner

PRIOR ART

PRIOR ART

BATTERY MODULE

CROSS-REFERENCE TO RELATED APPLICATIONS

This application is the United States national phase of International Application No. PCT/KR2013/005671 filed Jun. 27, 2013, and claims priority to Korean Patent Application No. 10-2012-0069520 filed Jun. 28, 2012, the disclosures of which are hereby incorporated in their entirety by reference.

TECHNICAL FIELD

The present invention relates to a battery module, and more particularly, to a battery module which may be simply assembled by providing partitions including voltage sensing wires between a plurality of stacked battery cells.

BACKGROUND ART

Generally, research into a secondary battery capable of being charged and discharged unlike a primary battery has been actively conducted in accordance with the development of state-of-the-art fields such as a digital camera, a cellular phone, a notebook, a hybrid automobile, and the like. An example of the secondary battery includes a nickel-cadmium battery, a nickel-metal hydride battery, a nickel-hydrogen battery, and a lithium secondary battery. Among them, the lithium secondary battery having an operating voltage of 3.6V or more is used as a power supply of a portable electronic device or a plurality of lithium secondary batteries are connected in series with each other to thereby be used for a high output hybrid automobile. Since this lithium secondary battery has the operating voltage three times higher than that of the nickel-cadmium battery or the nickel-metal hydride battery and is more excellent in view of energy density characteristics per unit weight than the nickel-cadmium battery or the nickel-metal hydride battery, the use of the lithium secondary battery has rapidly increased.

The lithium secondary battery may be manufactured in various types. As a representative type of the lithium secondary battery, there are a cylindrical type and a prismatic type that are mainly used for a lithium ion battery. A lithium polymer battery that has been recently spotlighted is manufactured in a pouch type having flexibility, such that it has a relatively free shape.

The pouch type lithium polymer battery (hereinafter, referred to as "pouch type cell") needs to be protected by a firm case apparatus in order to be used for a long time since it may be easily bent or curved. However, according to the related art, a method in which electrode taps of the respective pouches are connected to each other by a printed circuit board on which circuit patterns are formed for the series connection and are put into a case has been used.

However, a method for configuring a high output battery module by stacking the pouch type cells according to the related art may not safely protect the pouch type cells having a weak structure and also uses an imperfect scheme in which a plurality of pouch type cells are stacked to be connected to the PCB, such that it is not strong against an environment change such as external impact, or the like.

As a method capable of more firmly and stably stacking the pouch type cells configuring the lithium battery used for a high output power source and reliably connecting them in series with each other, there is Korean Patent Laid-Open Publication No. 2006-0102207 entitled "Case for High Power Rechargeable Lithium Battery".

Referring to FIG. 1, "Case for High Power Rechargeable Lithium Battery" of Korean Patent Laid-Open Publication No. 2006-0102207 includes a pouch supporting frame 21 supporting a pouch 11 of a pouch type cell 10 including the pouch 11 and an electrode tap 12, a shelf type heat dissipating part 22 formed on one surface of the pouch supporting frame 21 and providing a space to which heat generated in the pouch 11 is discharged, and a wall type tap supporting part 23 formed at one side of the heat dissipating part 22 to support the electrode tap 12 of the pouch type cell 10.

Referring to FIG. 2, a battery module 30 in which the pouch type cells 10 are firmly and stably stacked using "Case for High Power Rechargeable Lithium Battery" as described above may be manufactured.

However, since the battery module 30 as described above needs to couple the pouch supporting frame 21 onto both sides of the pouch cell 10 and electrically connect the pouch cell 10 and a neighboring pouch cell to each other, a process for manufacturing the same may be complex and assembly property and production property may not be excellent.

DISCLOSURE

Technical Problem

An object of the present invention is to provide a battery module having excellent assembly property and production property.

Technical Solution

In one general aspect, a battery module includes: a plurality of battery cells which are arranged to be stacked and are electrically connected to each other; a plurality of partitions positioned between the battery cells and having aluminum panels fixed on upper and lower surfaces thereof; and a printed circuit board (PCB) electrically connected to the battery cell, wherein the battery cell and the PCB are connected to each other by one or more voltage sensing wires positioned on the partitions and having one side which is in contact with a bus bar of the battery cell and the other side which is in contact with a PCB terminal formed on the PCB.

The battery cell has a bus bar welded to an electrode tap part and the bus bar has a bus bar hole formed therein, such that it may be closely adhered to a bus bar of a neighboring battery cell to be electrically connected thereto, and the bus bar and the partition may be fixed to each other by inserting short bolts into the bus bar hole and a bus bar fixing hole formed in the partition.

The voltage sensing wire may include: a bus bar contacting part which is positioned between the bus bar and the partition and is in contact with the bus bar; a PCB contacting part which is positioned between the partition and the PCB terminal and is in contact with the PCB terminal; and a sensing cable electrically connecting the bus bar contacting part and the PCB contacting part to each other.

The bus bar contacting part may have both sides formed to have steps and both sides of the bus bar contacting part may be inserted and fixed into a first insertion groove formed in the partition, and the PCB contacting part may have both sides formed to have steps and both sides of the PCB contacting part may be inserted and fixed into a second insertion groove formed in the partition.

The battery module may further include a temperature sensor positioned at a central portion of the partition, wherein the temperature sensor transmits temperature data to the PCB.

The PCB contacting part and the PCB terminal may be welded to each other by laser welding or spot welding.

Advantageous Effects

The battery module according to the present invention may have excellent assembly property and production property by providing the partitions including the voltage sensing wires between the plurality of stacked battery cells, may have excellent cooling efficiency by fixing aluminum panels on upper and lower surfaces of the partition, and may stably protect the battery cell.

BEST MODE

Hereinafter, a technical spirit of the present invention will be described in more detail with reference to the accompanying drawings.

However, the accompanying drawings are only examples shown in order to describe the technical spirit of the present invention in more detail. Therefore, the technical spirit of the present invention is not limited to shapes of the accompanying drawings.

Figure 1:
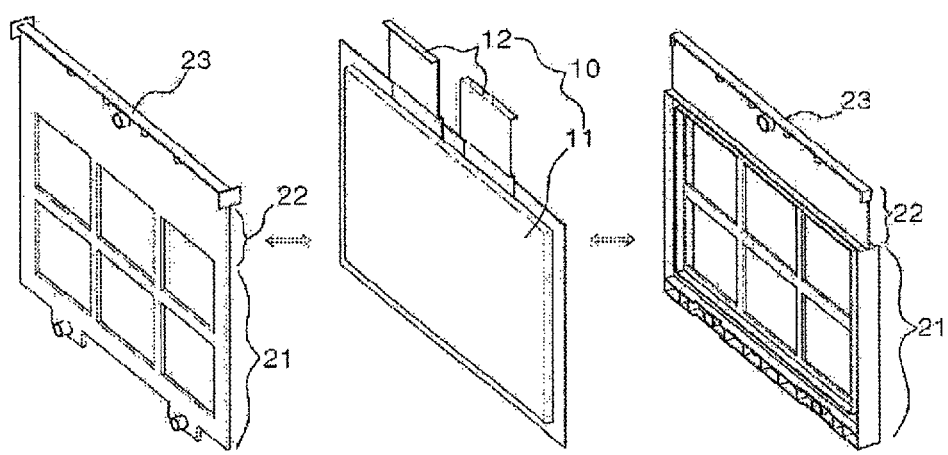
FIG. 1 is an exploded perspective view of a secondary battery using a case for a high output lithium secondary battery according to the related art.
Figure 2:
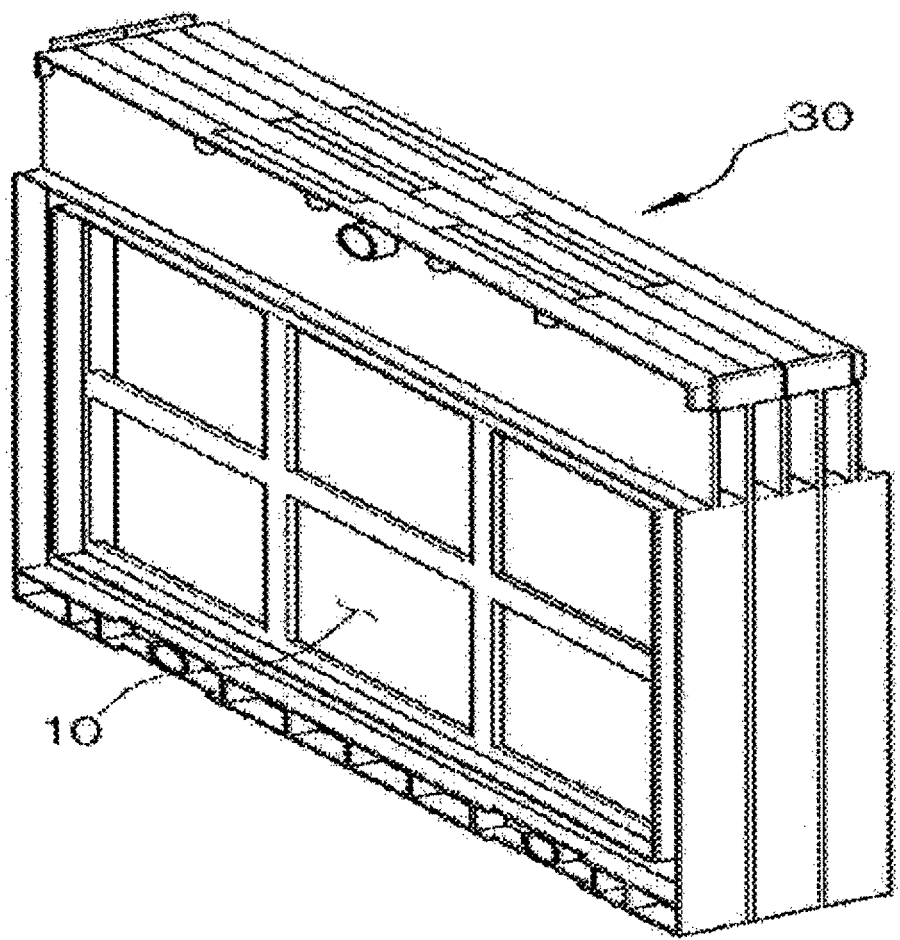
FIG. 2 is a perspective view of a battery module using the case for the high output lithium secondary battery according to the related art.
Figure 3:
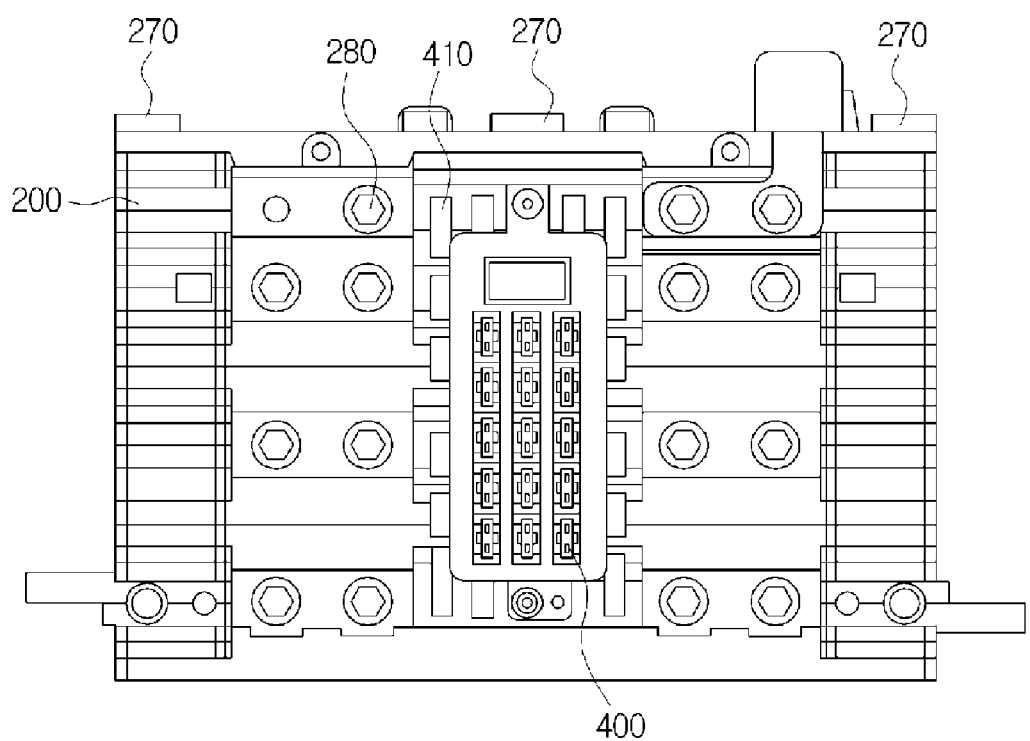
FIG. 3 is a front view of a battery module according to an exemplary embodiment of the present invention.

FIG. 3 is a front view showing a battery module 1000 according to the present invention.

The battery module 1000 according to the present invention includes a plurality of battery cells 100, a plurality of partitions 200, and a printed circuit board (PCB) 400.

The battery cell 100 has a bus bar 120 which is welded to an electrode tap 110 and is closely adhered to a bus bar 120 of a neighboring battery cell 100 to be electrically connected thereto.

Figure 4:
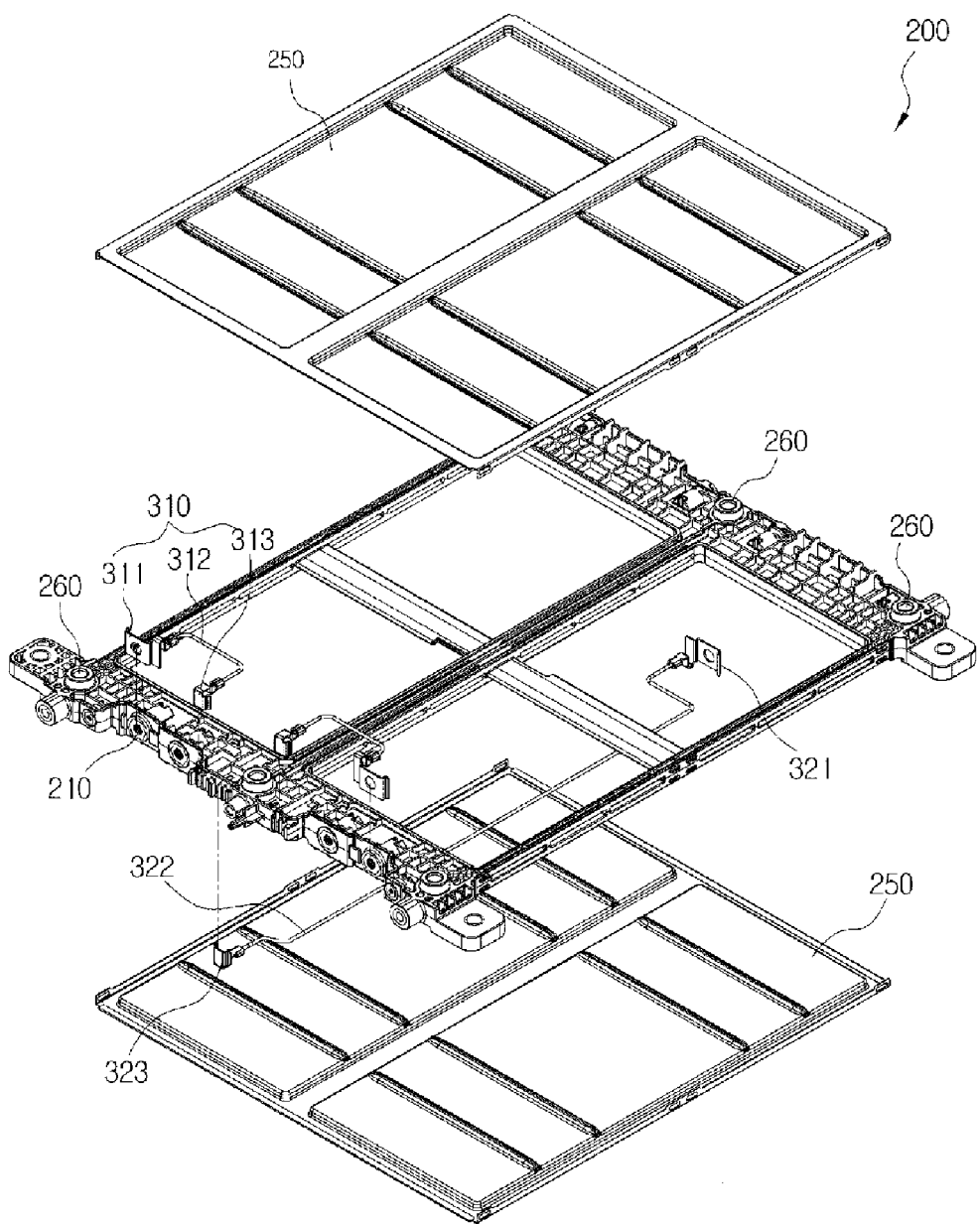
FIG. 4 is an exploded view of a partition according to an exemplary embodiment of the present invention.

The partition 200 is interposed between one or more battery cells 100, a bus bar hole 121 is formed in the bus bar 120, and a short bolt 280 is inserted into the bus bar hole 121 and is fixed into a bus bar fixing hole 210 formed in the partition 200 (see FIG. 4).

The PCB 400 measures a voltage of the battery cell 100 through a plurality of PCB terminals 410 electrically connected to the bus bar 120 and is connected to a temperature sensor 240 to be described below to receive internal temperature data of the battery module 1000.

In order to electrically connect the bus bar 120 and the PCB 400 to each other, the partition 200 includes one or more voltage sensing wires 300.

The partition 200 has a plurality of long bolt holes 260 punched therein, such that the partition 200 and a neighboring partition 200 are fixed to each other by long bolts 270.

Figure 5:
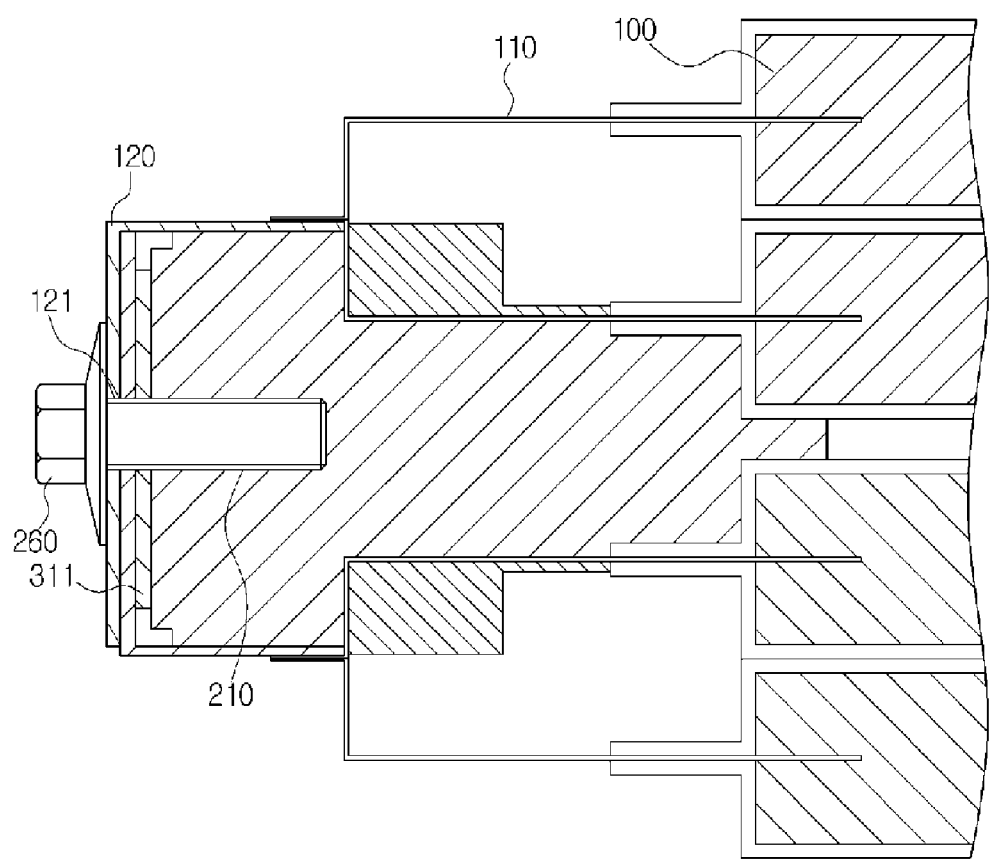
FIG. 5 is a partial cross-sectional view of the battery module according to the exemplary embodiment of the present invention.
Figure 6:
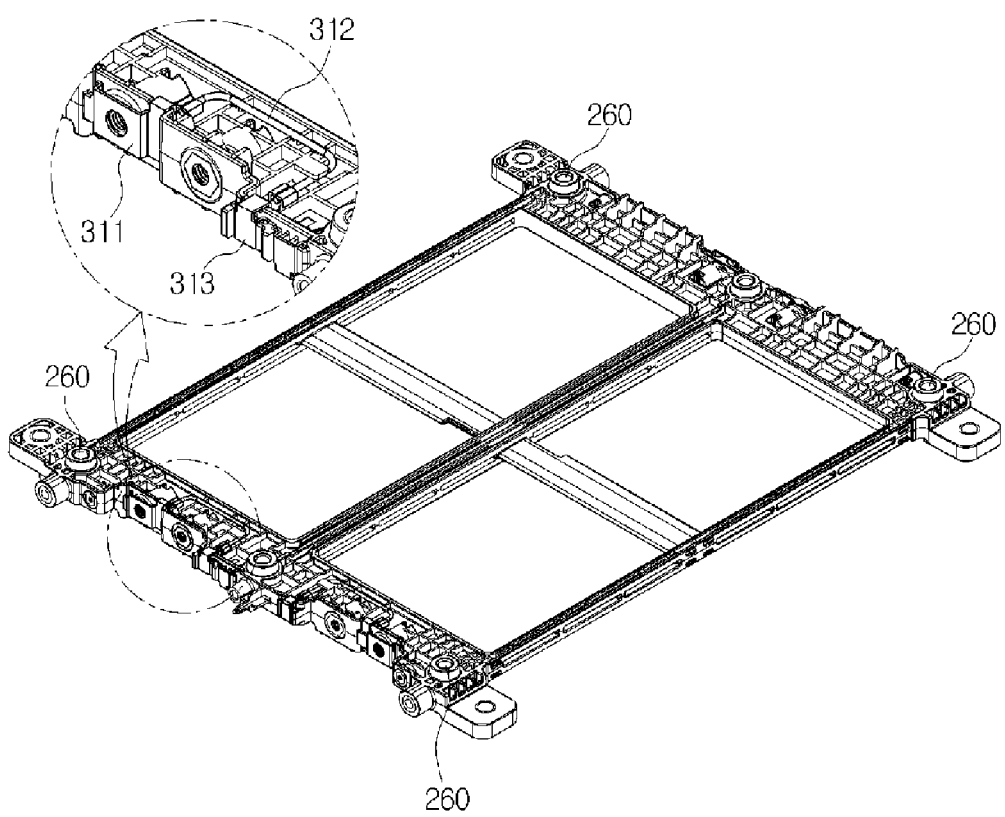
FIG. 6 is a perspective view and a partial enlarged view of the partition according to the exemplary embodiment of the present invention.
Figure 7:
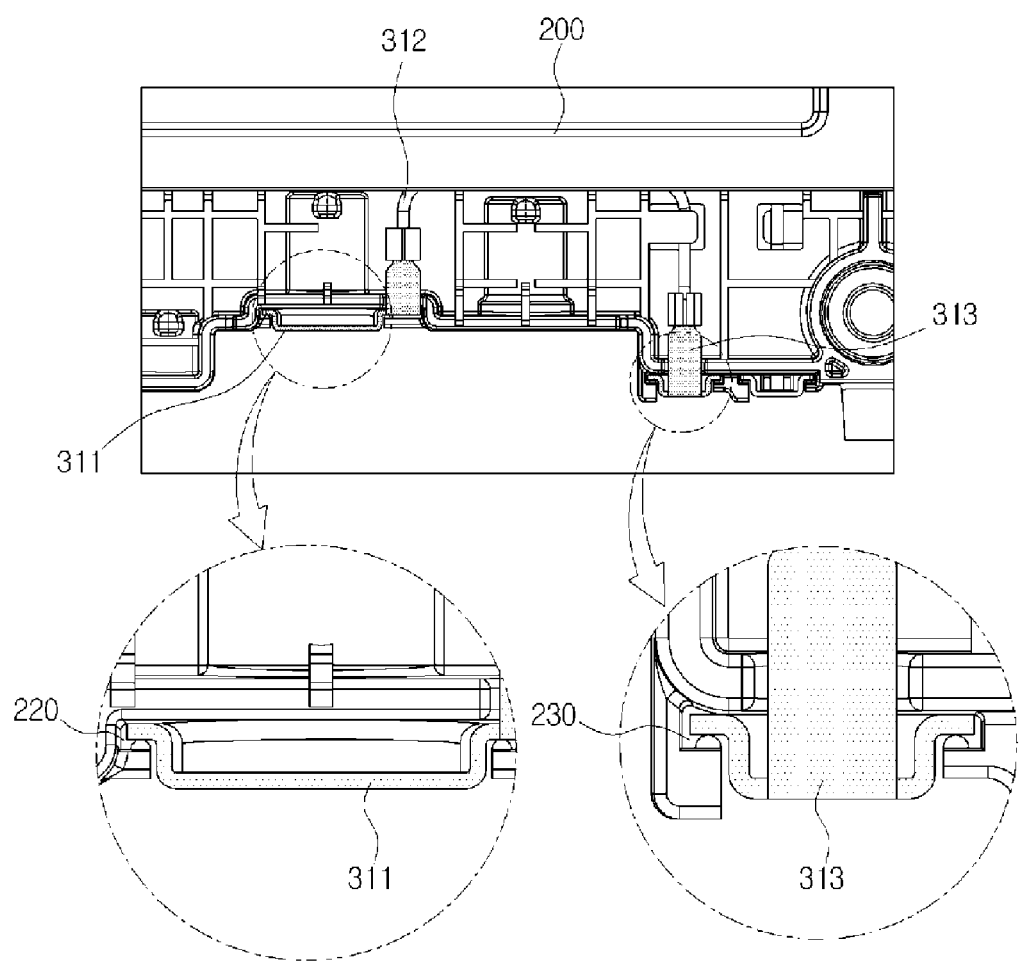
FIG. 7 is a partial enlarged view showing a coupling relationship between the partition and a voltage sensing wire according to an exemplary embodiment of the present invention.

The partition 200 according to an exemplary embodiment of the present invention will be described in detail with reference to FIGS. 5 to 7.

The partition 200 includes one or more voltage sensing wires 300 and one or more aluminum panels 250.

The partition 200 has the aluminum panels 250 which are each fixed on upper and lower surfaces thereof and the aluminum panels 250 are in contact with the battery cell 100 to absorb heat generated from the battery cell 100, thereby making it possible to improve stability of the battery module 1000.

In addition, the partition 200 includes one or more voltage sensing wires 300 and a shape of the voltage sensing wire 300 may be variously configured depending on a shape of the battery cell 100.

The voltage sensing wire 300 includes bus bar contacting parts 311 and 321, sensing cables 312 and 322, and PCB contacting parts 313 and 323 to electrically connect the battery cell 100 and the PCB 400 to each other.

The bus bar contacting parts 311 and 321 are formed on one side of the voltage sensing wire 300 and are in contact with the bus bar 120 of the battery cell 100.

In this case, the bus bar contacting parts 311 and 321 have both sides formed to have steps and both sides of the bus bar contacting parts 311 and 321 are inserted and fixed into a first insertion groove 220 formed in the partition 200.

The PCB contacting parts 313 and 323 are formed on the other side of the voltage sensing wire 300 and are in contact with the PCB terminal 410 of the PCB 400.

In this case, the PCB contacting parts 313 and 323 have both sides formed to have steps and both sides of the PCB contacting parts 313 and 323 are inserted and fixed into a second insertion groove 230 formed in the partition 200.

The sensing cables 312 and 322 electrically connect the bus bar contacting parts 311 and 321 and the PCB contacting parts 313 and 323 to each other, and are positioned within the partition 200 to thereby prevent the sensing cable 312 and 322 from being damaged by external impact.

Figure 8:
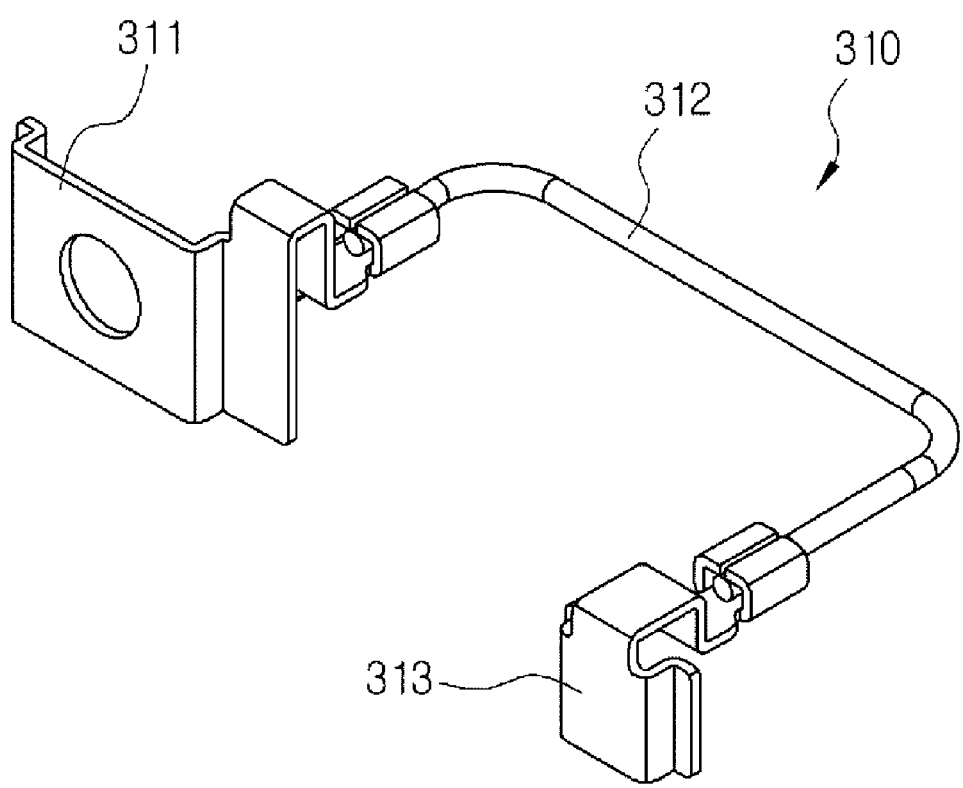
FIG. 8 is a perspective view of a first voltage sensing wire according to an exemplary embodiment of the present invention.

Various shapes of voltage sensing wires 310 and 320 according to an exemplary embodiment of the present invention will be described with reference to FIGS. 8 and 9.

The voltage sensing wire 300 includes a first voltage sensing wire 310 and a second voltage sensing wire 320.

By using a short sensing cable 312 such as the first voltage sensing wire 310 in the case in which a distance between the PCB terminal 410 and the bus bar 120 is short, and using a long sensing cable 322 such as the second voltage sensing wire 320 in the case in which the distance between the PCB terminal 410 and the bus bar 120 is long, a voltage generated from the bus bar 120 may be transferred to the PCB 400.

Figure 9:
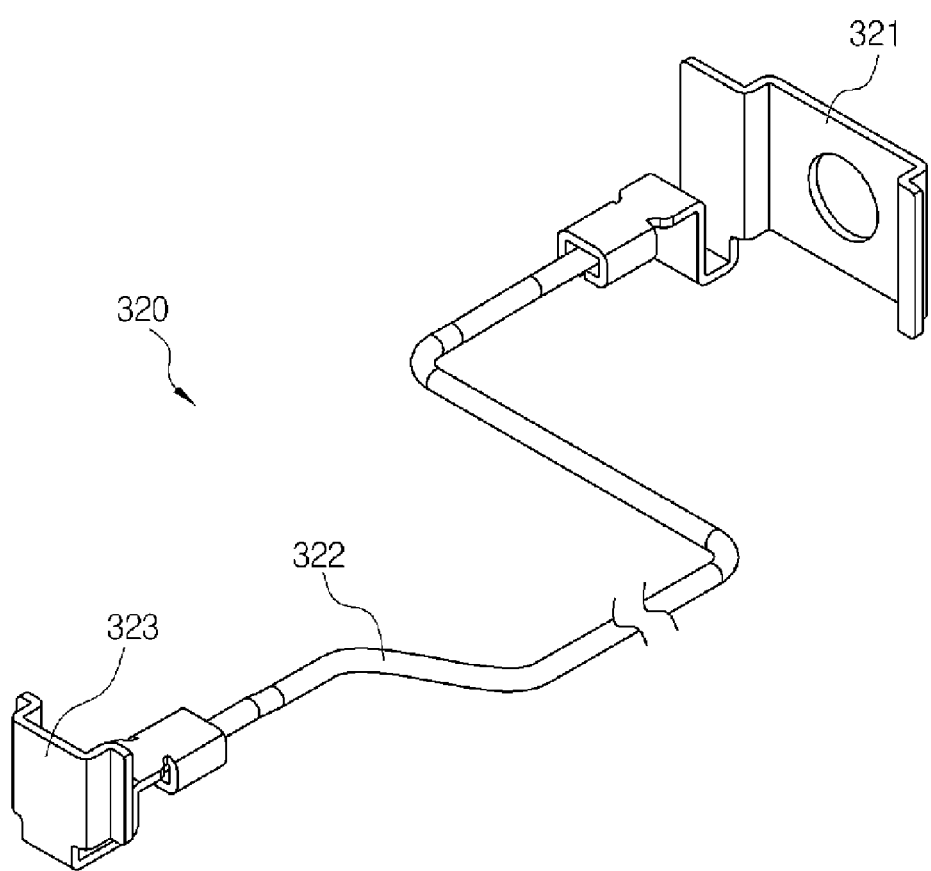
FIG. 9 is a perspective view of a second voltage sensing wire according to an exemplary embodiment of the present invention.

In addition, the partition 200 has a temperature sensor 240 which is also provided to a central portion thereof to transmit data measured by the temperature sensor 240 to the PCB 400 (see FIG. 9).

Figure 10:
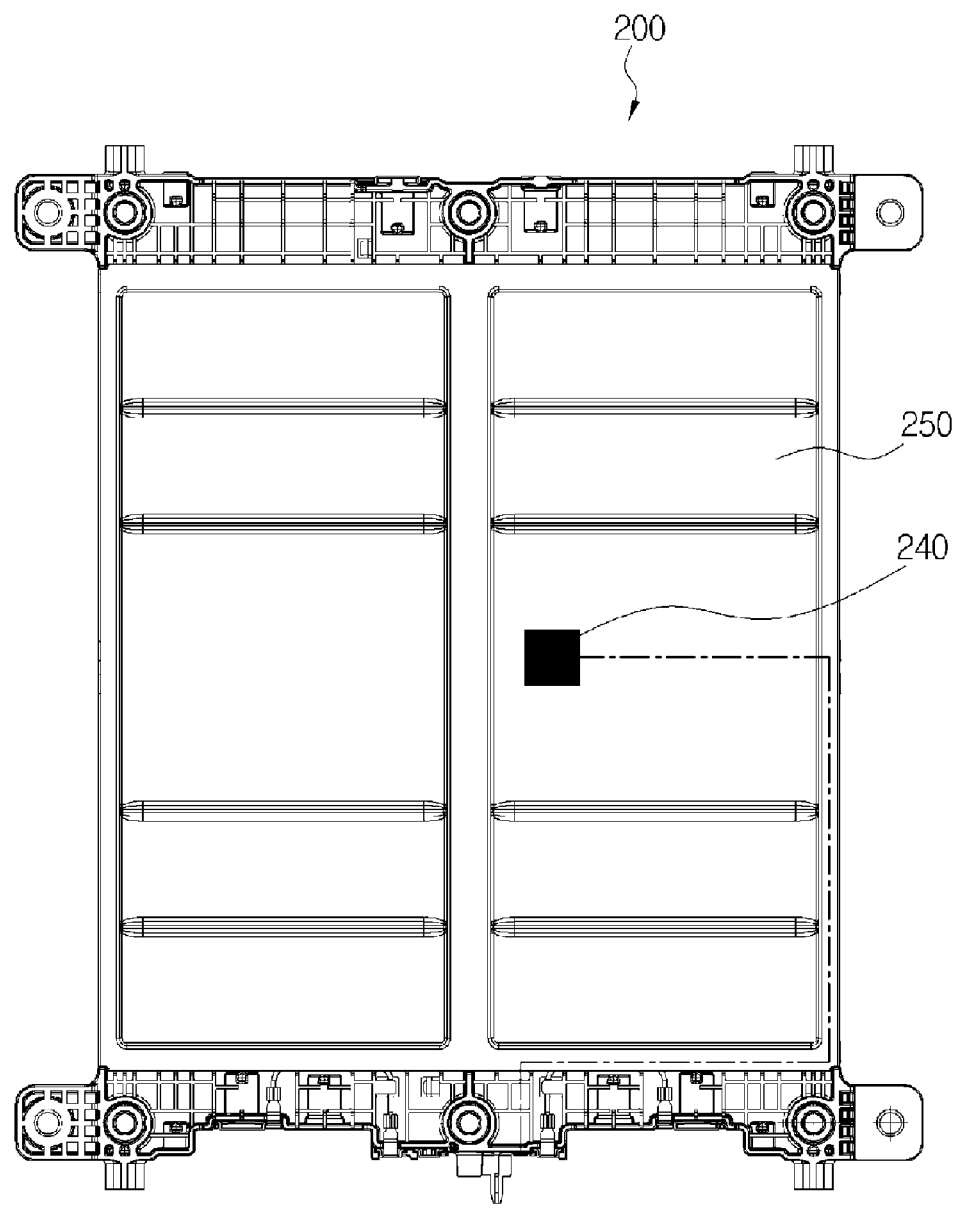
FIG. 10 is a plan view of the partition according to the exemplary embodiment of the present invention.

A method for bonding the PCB 400 and the voltage sensing wire 300 according to an exemplary embodiment of the present invention will be described with reference to FIG. 10.

As shown, the battery cells 100 and the partitions 200 interposed between the battery cells 100 are coupled to each other by the long bolts 270 and the PCB 400 is then coupled thereto, such that the voltage may be measured by the plurality of voltage sensing wires 300 connected to the respective bus bars 120. In this case, the PCB contacting parts 313 and 323 and the PCB terminal 410 may be welded to each other by laser welding or spot welding.

[Detailed Description of Main Elements]

| | |
|---|---|
| 1000: battery module | |
| 100: battery cell | 110: electrode tap |
| 120: bus bar | 121: bus bar hole |
| 200: partition | 210: bus bar fixing hole |
| 220: first insertion groove | |
| 230: second insertion groove | |
| 240: temperature sensor | 250: aluminum panel |
| 260: long bolt hole | 270: long bolt |
| 280: short bolt | |
| 300: voltage sensing wire | |
| 310: first voltage sensing wire bar contacting part | 311: bus |
| 312: sensing cable | 313: PCB contacting part |
| 320: second voltage sensing wire bar contacting part | 321: bus |
| 322: sensing cable | 323: PCB contacting part |
| 400: PCB | 410: PCB terminal |

The invention claimed is:

1. A battery module, comprising:
    a plurality of battery cells which are arranged to be stacked and are electrically connected to each other;
    a plurality of partitions positioned between the battery cells and having aluminum panels fixed on upper and lower surfaces thereof;
    a printed circuit board (PCB) electrically connected to the battery cell;
    a bus bar electrically connected to the battery cell,
    wherein the battery cell and the PCB are connected to each other by one or more voltage sensing wires positioned on the partitions and having one side which is in contact with a bus bar of the battery cell and the other side which is in contact with a PCB terminal formed on the PCB, and
    wherein the bus bar is fixed onto the partition by inserting short bolts into a bus bar hole formed in the bus bar and a bus bar fixing hole formed in the partition.

2. The battery module of claim 1, wherein the voltage sensing wire includes:
    a bus bar contacting part which is formed at one side thereof and is in contact with the bus bar;
    a PCB contacting part which is formed at the other side thereof and is in contact with the PCB terminal; and
    a sensing cable electrically connecting the bus bar contacting part and the PCB contacting part to each other.

3. The battery module of claim 2, wherein the bus bar contacting part has both sides formed to have steps and both sides of the bus bar contacting part are inserted and fixed into a first insertion groove formed in the partition, and
    the PCB contacting part has both sides formed to have steps and both sides of the PCB contacting part are inserted and fixed into a second insertion groove formed in the partition.

4. The battery module of claim 3, further comprising a temperature sensor positioned at a central portion of the partition,
    wherein the temperature sensor transmits temperature data to the PCB.

5. The battery module of claim 2, wherein the PCB contacting part and the PCB terminal are welded to each other by laser welding or spot welding.

* * * * *